United States Patent
Chou

(10) Patent No.: US 9,664,187 B2
(45) Date of Patent: May 30, 2017

(54) PEN-TYPE PRESSURE INDICATOR FOR AIR COMPRESSOR

(71) Applicant: Wen-San Chou, Tainan (TW)

(72) Inventor: Wen-San Chou, Tainan (TW)

(*) Notice: Subject to any disclaimer, the term of this patent is extended or adjusted under 35 U.S.C. 154(b) by 0 days.

(21) Appl. No.: 14/850,874

(22) Filed: Sep. 10, 2015

(65) Prior Publication Data

US 2016/0076534 A1  Mar. 17, 2016

(30) Foreign Application Priority Data

Sep. 15, 2014  (TW) .............................. 103131823 A

(51) Int. Cl.

| G01L 19/08 | (2006.01) |
|---|---|
| F04B 51/00 | (2006.01) |
| F04B 33/00 | (2006.01) |
| F04B 35/01 | (2006.01) |
| F04B 35/04 | (2006.01) |
| F04B 39/12 | (2006.01) |
| F04B 49/08 | (2006.01) |
| F04B 49/10 | (2006.01) |
| G01L 7/16 | (2006.01) |
| G01L 19/10 | (2006.01) |

(52) U.S. Cl.
CPC ............ *F04B 51/00* (2013.01); *F04B 33/005* (2013.01); *F04B 35/01* (2013.01); *F04B 35/04* (2013.01); *F04B 39/12* (2013.01); *F04B 39/121* (2013.01); *F04B 49/08* (2013.01); *F04B 49/10* (2013.01); *G01L 7/16* (2013.01); *G01L 7/163* (2013.01); *G01L 7/166* (2013.01); *G01L 19/08* (2013.01); *G01L 19/10* (2013.01)

(58) Field of Classification Search
None
See application file for complete search history.

(56) References Cited

U.S. PATENT DOCUMENTS

| 2008/0034878 A1* | 2/2008 | Kurtz .................... G01L 13/025 73/715 |
| 2016/0076957 A1* | 3/2016 | Chou ...................... F16K 37/00 73/744 |
| 2016/0076963 A1* | 3/2016 | Chou ...................... F04B 35/01 73/756 |

\* cited by examiner

*Primary Examiner* — Andre Allen

(57) ABSTRACT

A pen-type pressure indicator, which can be detachably connected to an air compressor for measuring the pressure of compressed air produced in the air compressor, includes a transparent tube and a slider. The slider can be moved along a first bore and a second bore of the transparent tube. The motion of the slider in the transparent tube is similar to the motion of a piston in a cylinder. The transparent tube is provided with a tapered annular surface, between the first bore and the second bore. In addition to measuring the pressure of the compressed air delivered to an object, when the pressure of the compressed air exceeds a predetermined pressure, excessive air can be released into the environment, without requiring the air compressor to be installed with a safety valve, so that the object can be protected from damages due to overpressure.

5 Claims, 11 Drawing Sheets

PEN-TYPE PRESSURE INDICATOR FOR AIR COMPRESSOR

Technical Field of the Invention

The present invention relates to a pen-type pressure indicator for an air compressor and, more particularly, to a pressure indicator which has the appearance of a pen and can conduct an operation similar to a piston moving in a cylinder for measuring the pressure of compressed air supplied from the air compressor, and furthermore, in inflating an object, when the pressure of the compressed air exceeds a predetermined pressure, excessive air can be released into the ambient environment without requiring the air compressor to be installed with a safety valve, so that the object can be protected from damages due to overpressure.

Description of the Prior Art

Conventionally, air compressors, especially the small air compressors being used for inflating objects such as tires and air cushions, are provided with two outlets at an air storage container, one of which is connected with a circular pressure gauge, and the other one of which is connected with a hose with an air nozzle by which an object, such as a tire, can be inflated. The circular pressure gauge can show the pressure of the compressed air within the air storage container for a user. According to the measured pressure, the user can operate the air compressor properly to inflate the object. Since the circular pressure gauge, which employs a Bourdon tube as a pressure sensor, contains precision components, when it falls to the ground or experiences a large impact, the pressure gauge is prone to be damaged and thus lose its accuracy. To overcome the disadvantage of the Bourdon-tube pressure gauges, a pressure display device, registered as Japan utility model 3185073, was disclosed, wherein the pressure display device generally includes a tube, an elongated bar, a spring, and a ruler. The pressure display device is featured in that the tube is provided with an air escaping hole at its surrounding wall. In use, the tube receives compressed air from an air compressor, so that a push block within the tube can be forced by the compressed air to move the elongated bar forward and compress the spring, so that the pressure of the compressed air can be measured. When the air pressure of the compressed air exceeds a predetermined pressure set for an object to be inflated, excessive air can be released into the ambient environment through the air escaping hole of the tube, so that the object can be prevented from over-inflation.

However, the pressure escaping hole is too small; it cannot release air effectively upon an instantaneous pressure surge of the compressed air. Besides, the pressure escaping hole is prone to be blocked by dust and dirt, so that the pressure releasing function is probably affected.

Furthermore, in the pressure display device, one end of the elongated bar is inserted into a locking groove of the push block and the other end of the elongated bar is inserted through a hole of a sleeve attached at the tube. The vibration of the air compressor will cause the elongated bar to be shifted from its normal position, which will in turn cause an oblique movement of the elongated bar, so that the friction between the elongated bar and the sleeve will be increased, and thus the hole of the sleeve will be enlarged. Consequently, the elongated bar is easy to vibrate and finally it may be removed from the push block A further disadvantage of the pressure display device is that the tube and the ruler will occupy a significant length.

In view of the foregoing, there is a need to develop a robust pressure indicator for an air compressor, which can accurately measure the pressure of air supply from the air compressor and effectively release excessive air into the ambient environment, without using a mechanical safety valve, when a high pressure occurs.

SUMMARY OF THE INVENTION

One object of the present invention is to provide a pressure indicator for an air compressor, which has the appearance of a pen and can be quickly connected to an outlet of the air compressor and disconnected from the outlet of the air compressor.

According to one feature of the pressure indicator, the pressure indicator includes a transparent tube, and a slider fitted in the transparent tube, wherein the slider can be moved along the transparent tube, in a way similar to a piston being moved in a cylinder, to measure the pressure of compressed air supplied from the air compressor.

According to another feature of the pressure indicator, the transparent tube of the pressure indicator is provided with a tapered annular surface between a first bore and a second bore thereof. As such, in addition to measuring the pressure of the compressed air delivered to an object, when the pressure of the compressed air exceeds a predetermined pressure, excessive air can be released into the ambient environment via an annular gap between the slider and the tapered annular surface, so that the object can be protected from damages due to overpressure, without requiring the air compressor to be installed with a safety valve.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
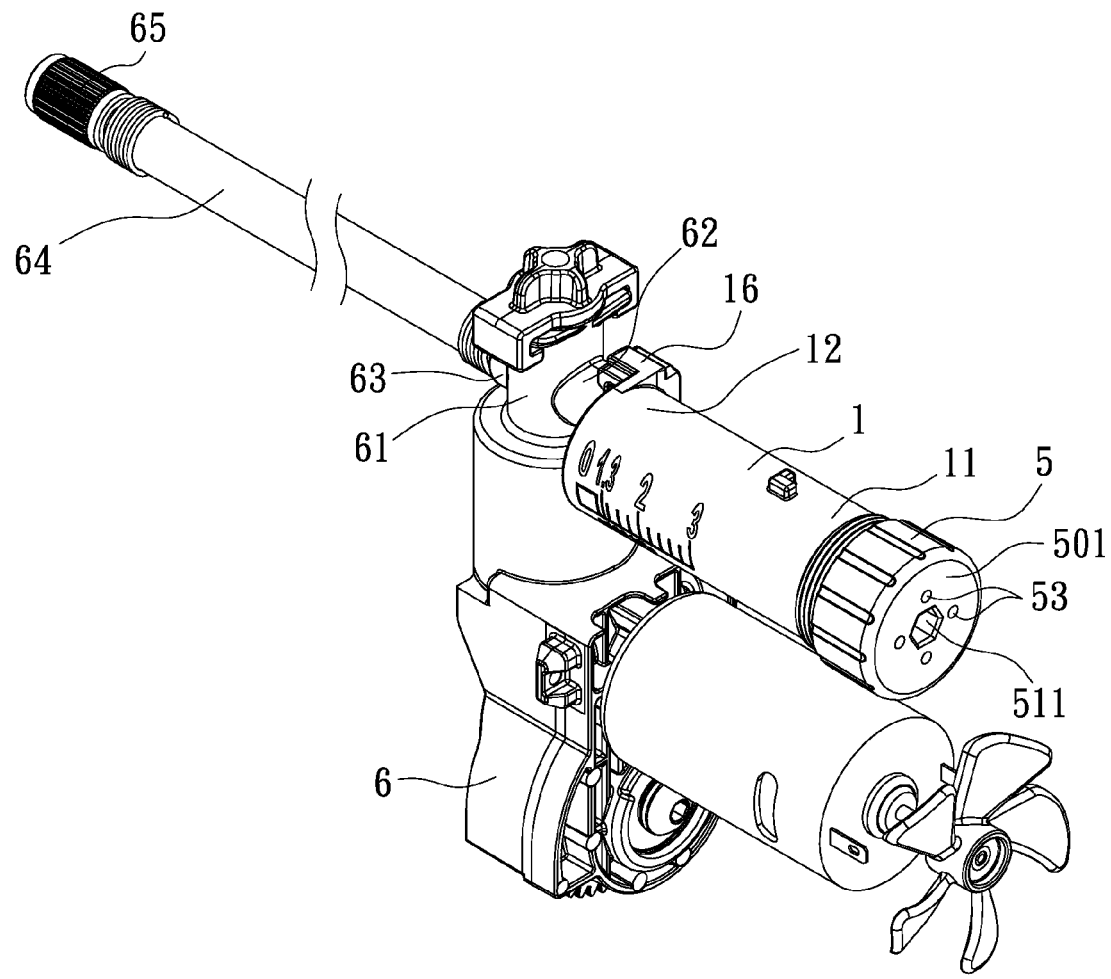
FIG. 1 shows a 3-dimensional view of a pressure indicator connected to an air compressor according to one embodiment of the present invention.
Figure 2:
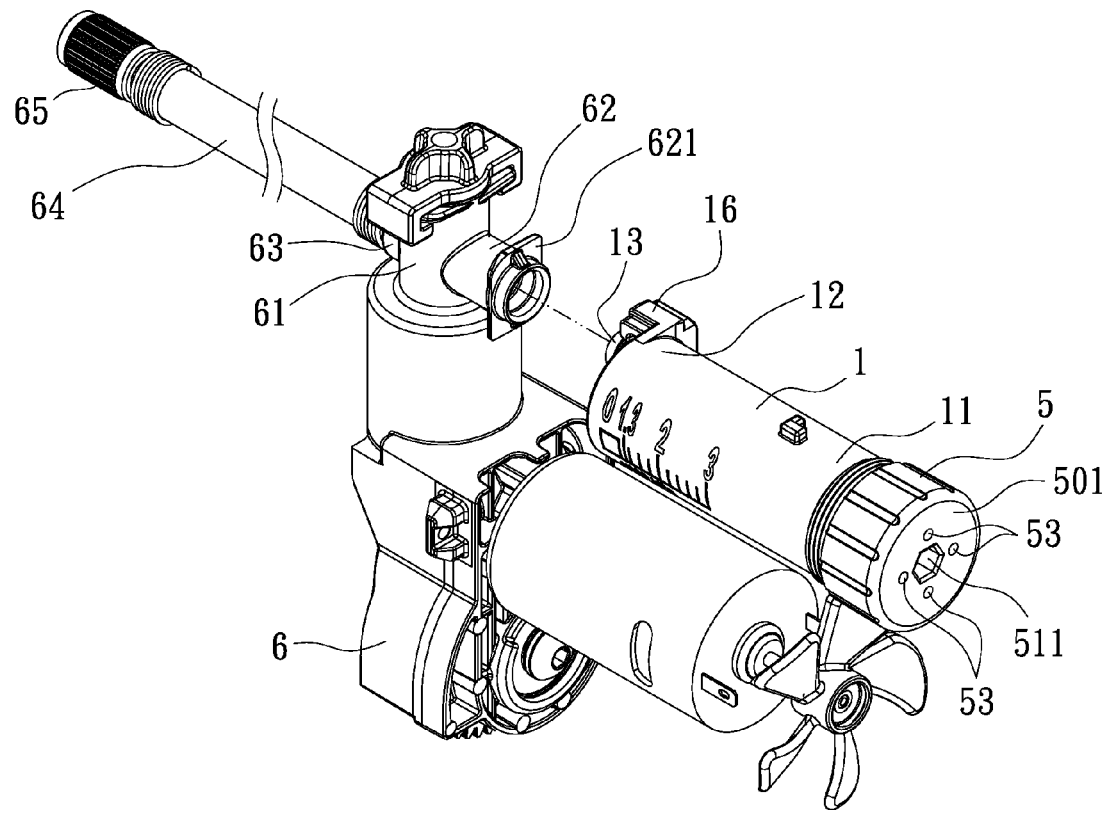
FIG. 2 shows a 3-dimensional view of the pressure indicator being disconnected from the air compressor.
Figure 3:
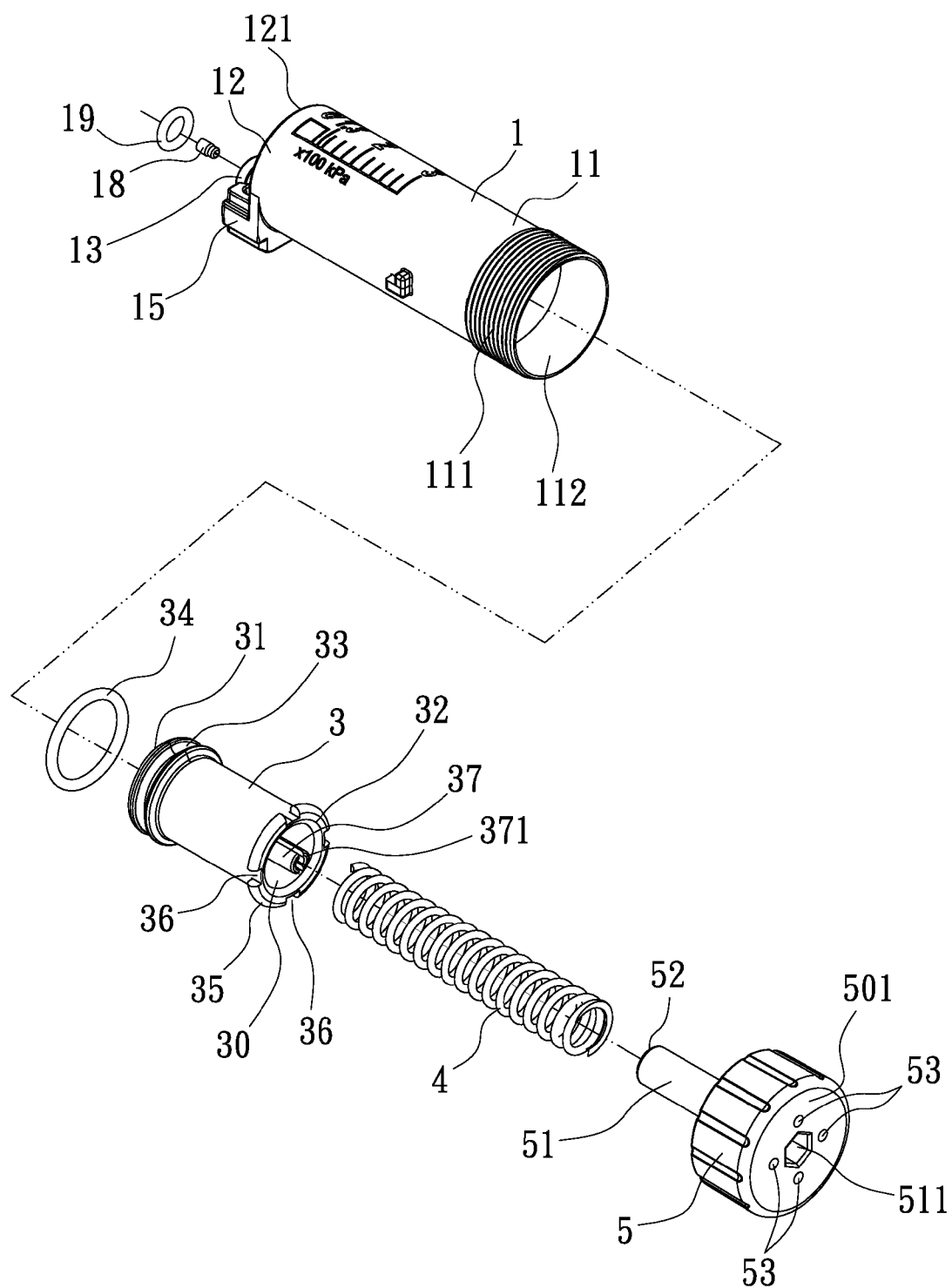
FIG. 3 shows an exploded view of the pressure indicator.

Referring to FIGS. 1 through 3, a pressure indicator for an air compressor 6 according to one embodiment of the present invention is shown, wherein the pressure indicator has the appearance of a pen; namely, it has an elongated shape. In this embodiment, the pressure indicator generally comprises a transparent tube 1, a slider 3, a compression spring 4, and a cap 5. The transparent tube 1 includes a first segment 11 and a second segment 12. The second segment 12 has an end wall 121 provided with an off-centered connector 13, which is not aligned with the central axis of the transparent tube 1. The connector 13 defines therethrough an air channel 14, which is composed of a small-diameter channel 141 and a large-diameter channel 142 (see FIG. 4), and can be used for connection to one outlet 62 of the air storage container 61 of the air compressor 6. The end wall 121 of the second segment 12 is further provided with a pair of connection hooks 15, 16 at two opposite sides of the connector 13. In this embodiment, the air compressor 6 can be provided with a flange 621 at its outlet 62. As such, the connection hooks 15, 16 can be engaged with the flange 621 of the outlet 62 of the air compressor 6 by turning the transparent tube 1, so that the pressure indicator can be quickly connected to the air compressor 6. On the other hand, the pressure indicator can be disconnected from the outlet 62 of the air compressor 6 by turning the transparent tube 1 in a reverse direction. Meanwhile, the connector 13 can be inserted into the outlet 62, so that compressed air produced in the air compressor 6 can flow into the transparent tube 1 via the air channel 14. As shown in FIG. 1, another outlet 63 of the air storage container 61 of the air compressor 6 is connected with a hose 64 having an air nozzle 65 which can be connected with an object desired to be inflated. As such, the compressed air supplied from the air compressor 6 can be delivered to the object via the hose 64 with the air nozzle 65. With the pressure indicator, the pressure of the compressed air can be revealed at the transparent tube 1 of the pressure indicator.

Figure 4:
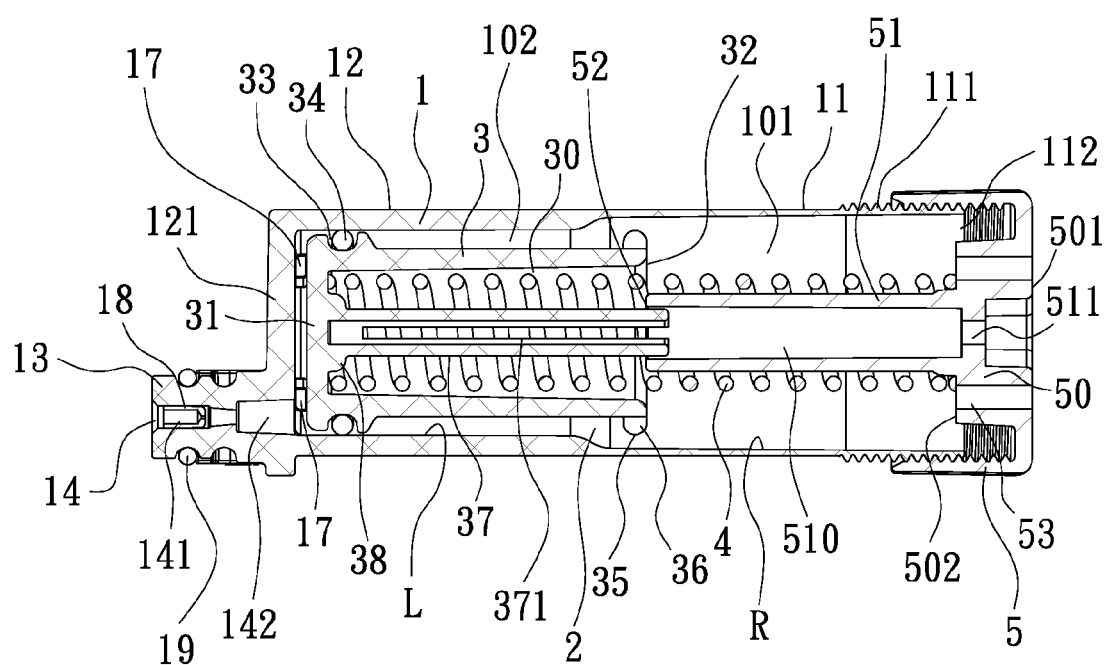
FIG. 4 shows a sectional view of the pressure indicator, which is at its original position.

Referring to FIGS. 3 and 4, the transparent tube 1, which functions as a pump's cylinder, includes the first segment 11 and the second segment 12. The first segment 11 defines therein a first bore 101, and the second segment 12 defines therein a second bore 102. The diameter (R) of the first bore 101 of the first segment 11 is greater than the diameter (L) of the second bore 102 of the second segment 12. The first segment 11 is integrally formed with the second segment 12 such that a tapered annular surface 2 is formed between an inner surface of the first segment 11, which defines the first bore 101, and an inner surface of the second segment 12, which defines the second bore 102. Although this embodiment provides the tapered annular surface 2, which extends outwardly with the central axis of the transparent tube 1 in a linear path, a curved annular surface, which extends outwardly with the axis of the transparent tube 1 in a curved path, can be used as well. The first segment 11 has an open end 112, opposite to the second segment 12, at which external threads 111 are provided. The end wall 121 of the segment 12 is provided with a plurality of spaced buffering pads 17 at its inner surface. The connector 13 is provided with an O-ring 19 at its outer surface. The small-diameter channel 141 of the air channel 14 is fitted with a buffering plug 18 to moderate instantaneous pressure surge of the compressed air supplied from the air compressor 6. The large-diameter channel 142 of the air channel 14 is adjacent to the second segment 12 of the transparent tube 1. Furthermore, the second segment 12 is provided with a pressure-indicating scale at its outer surface.

The slider 3 is mounted in the transparent tube 1 for being pushed by the compressed air from the outlet 62 of the air compressor 6 to move towards the open end 112 of the first segment 11 of the tube 1. According to the length of the movement of the slider 3, the pressure of the compressed air can be obtained. Specifically, the slider 3 is shaped as a generally hollow cylindrical body which has an open end 32 with an annular outwardly protruding edge 35 and a closed end 31 opposite to the open end 32 thereof and defines therein an inner space 30, wherein the annular outwardly protruding edge 35 defines a plurality of spaced cuts 36. The slider 3 have a central tube 37 which extends from an inner surface of its closed end 31, through the inner space 30 thereof, to go beyond the open end 32 thereof, wherein a step 38 is formed between the inner surface of the closed end 31 and the central tube 37. The central tube 37 of the slider 3 defines a plurality of spaced slits 371 along its outer surface. The slider 3 defines at its surrounding wall, near its closed end 31, an annular groove 33 to be fitted with a colored O-ring 34. The slider 3 can be fitted in the transparent tube 1 and cooperated with the compression spring 4. The air channel 14, which is composed of the small-diameter channel 141 and the large-diameter channel 142, communicates with the first and second bores 101, 102 of the transparent tube 1. The compressed air supplied from the air compressor 6 can force the slider 3 to move, in a way similar to a piston, along the first and second bores 101, 102 of the transparent tube 1.

The compression spring 4 is received in the inner space 30 of the slider 3 and fitted around the central tube 37 of the slider 3, wherein one end of the compression spring 4 is urged against the inner surface of the closed end 31 of the slider 3. The compression spring 4 slightly contacts an inner surface of the slider 3 that defines the inner space 30 of the slider 3 (see FIG. 4). As such, the closed end 31 of the slider 3 can be forced by the compression spring 4 to abut against the buffering pads 17 of the transparent tube 1.

Referring again to FIGS. 3 and 4, the cap 5, which can be threadedly mounted to the open end 112 of the first segment 11 of the tube 1, has an inner base 50 and a central tube 51 extending from the inner base 50. The central tube 51 of the cap 5 has a diameter less than the inner base 50 of the cap 5, thus forming an annular inner surface 502 therebetween. Furthermore, the central tube 51 of the cap 5 has an open end 52 opposite to the inner base 50 and defines therein a central hole 510 which opens out at the open end 52 thereof, wherein the central hole 510 of the central tube 51 of the cap 5 has a diameter greater than the central tube 37 of the slider 3, but the diameter of the central tube 51 being less than the internal diameter of the compression spring 4. The other end of the compression spring 4 is urged against the annular inner surface 502 of the inner base 50 of the cap 5. After the cap 5 has been threadedly mounted to the open end 112 of the transparent tube 1, the central tube 51 of the cap 5 can fit around the central tube 37 of the slider 3 via its open end 52, wherein the diameter of the central tube 37 of the slider 3 is slightly less than that of the central hole 510 of the central tube 51 of the cap 5. The inner base 50 of the cap 5 defines therethrough a central through hole 511, generally between the outer surface 501 and the annular inner surface 502 thereof, communicating with the central hole 510 of the cap 5, and defines a plurality of peripheral through holes 53 around the central through hole 511. The transparent tube 1, the slider 3, the colored O-ring 34, the compression spring 4, and the cap 5 are assembled to form the embodiment of the pressure indicator as shown in FIG. 2.

Referring again to FIGS. 1 and 2, the connection hooks 15, 16 and connector 13 provided at the transparent tube 1 are designed according to the features of the air compressor 6. For example, the outlet 62 of the air compressor 6 can be provided with the flange 621, so that the pressure indicator can be quickly connected to the air compressor 6.

Figure 5:
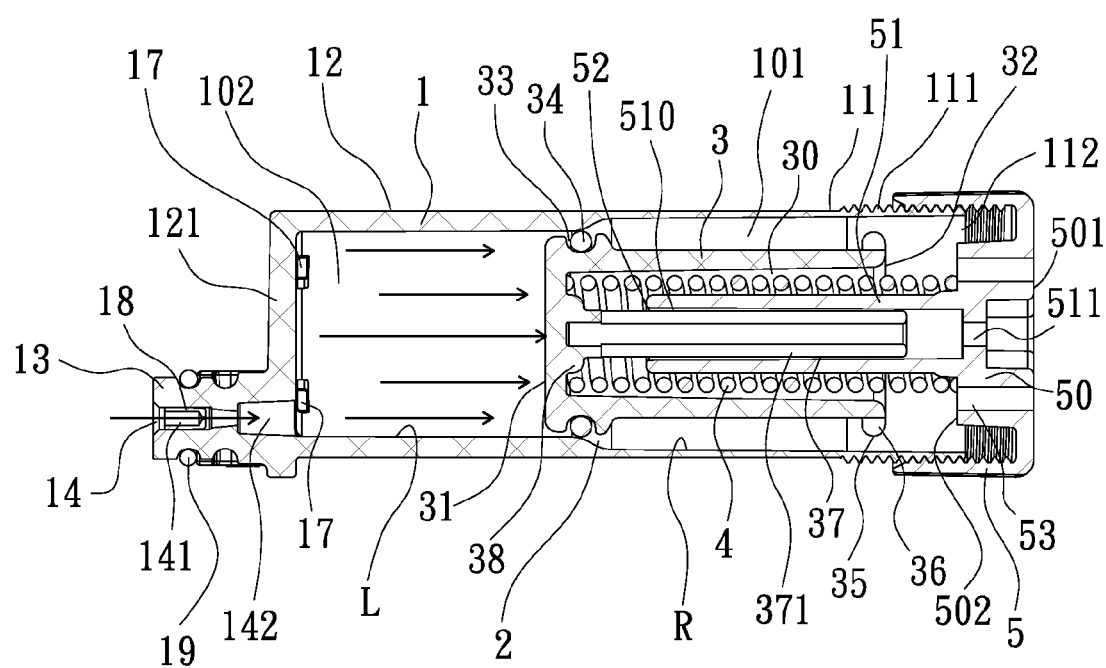
FIG. 5 shows a sectional view of the pressure indicator, wherein the slider is forced by compressed air to move towards the open end of the tube.
Figure 6:
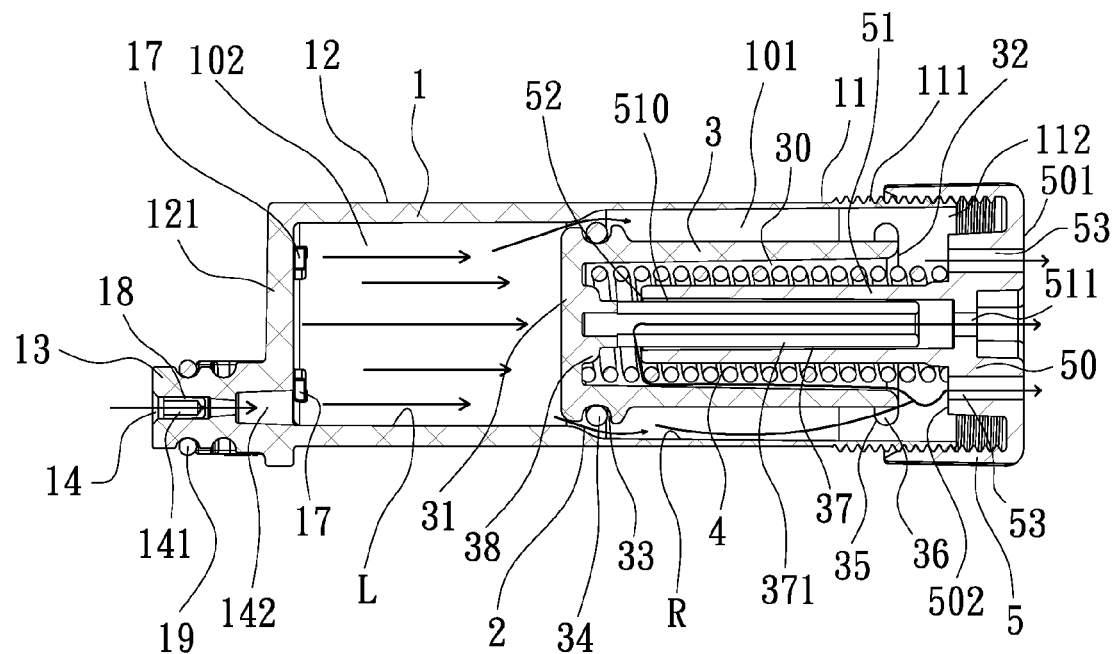
FIG. 6 shows a sectional view of the pressure indicator, wherein the slider is moved further by compressed air which exceeds a predetermined pressure.
Figure 7:
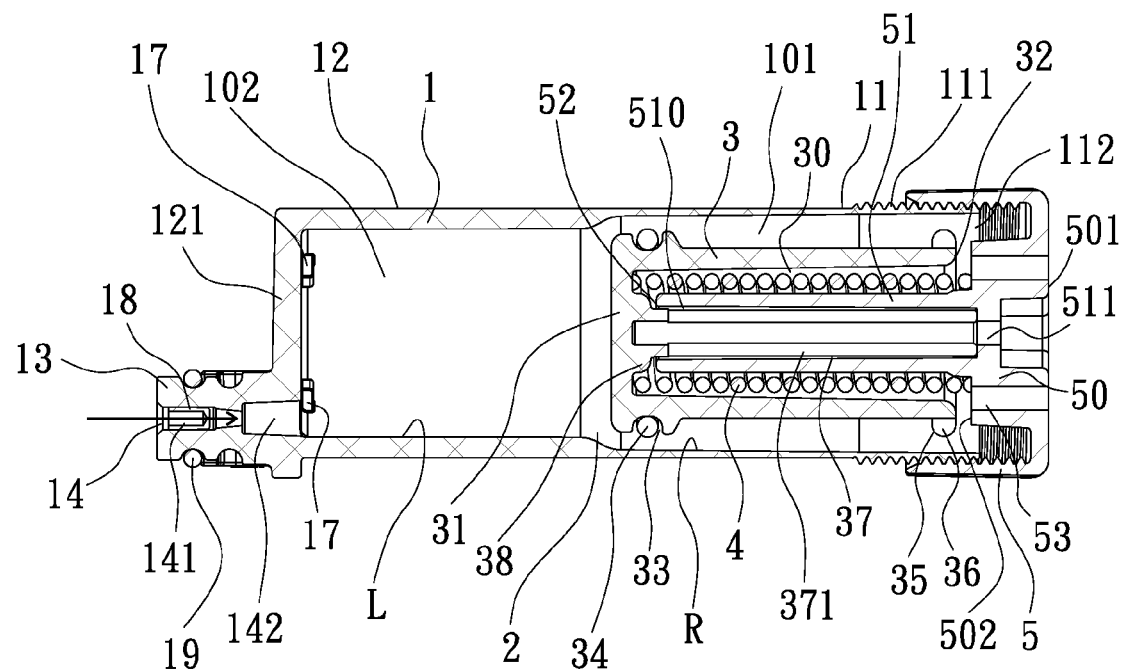
FIG. 7 shows a sectional view of the pressure indicator, wherein the slider is moved to its ultimate position.

Referring now to FIGS. 1 and 4, in operation, compressed air supplied from the outlet 62 of the air compressor 6 can flow into the transparent tube 1 via the air channel 14 of the connector 13, wherein the compressed air can pass through the small-diameter passage 141, in which the buffering plug 18 is fitted for moderating instantaneous pressure surge of the compressed air, before passing through the large-diameter passage 142. Thereafter, the compressed air can overcome the compression spring 4 to have the slider 3 moved towards the open end 112 of the transparent tube 1 and the cap 5. According to the pressure-indicating scale provided on the transparent tube 1, the position of the colored seal ring 34 provided on the slider 3, which reflects the pressure of the compressed air, can be clearly seen through by a user. The operation of the pressure indicator for measuring the pressure of the compressed air is shown in FIGS. 4 and 5. After finishing the inflating operation for an object, the pressure indicator can be disconnected from the air compressor 6. Therefore, the compression spring 4 can force the slider 3 to return to its original position, as shown in FIG. 4. Particularly, in operation, when the pressure of the compressed air exceeds a predetermined pressure, the slider 3 can be moved from the second bore 102 of the second segment 12 to the first bore 101 of the first segment 11. The colored O-ring 34 of the slider 3 can reach the tapered annular surface 2 of the transparent tube 1, wherein an annular gap is existed between the colored O-ring 34 and the tapered annular surface 2 (see FIG. 6), so that some of the excessive compressed air may flow through the annular gap to enter the first bore 101 of the first segment 11 and then pass through the peripheral through holes 53 to flow out of the pressure indicator. In addition, some of the excessive compressed air may enter the inner space 30 of the slider 3 via the spaced cuts 36, and then flow into the central hole 510 of the cap 5 via the slits 371 of the central tube 37 of the slider 3, and finally pass through the central through hole 511 of the cap 5 to be released into the ambient environment, so that the object can be protected from damages due to overpressure. Furthermore, under an excessive pressure, the step 38 formed between the inner surface of the closed end 31 and the central tube 37 of the slider 3 may contact the end of the central tube 51 of the cap 5 to prevent the compression spring 4 from being excessively compressed (see FIG. 7), so that the elastic fatigue and deformation of the compression spring 4 can be avoided.

Figure 8:
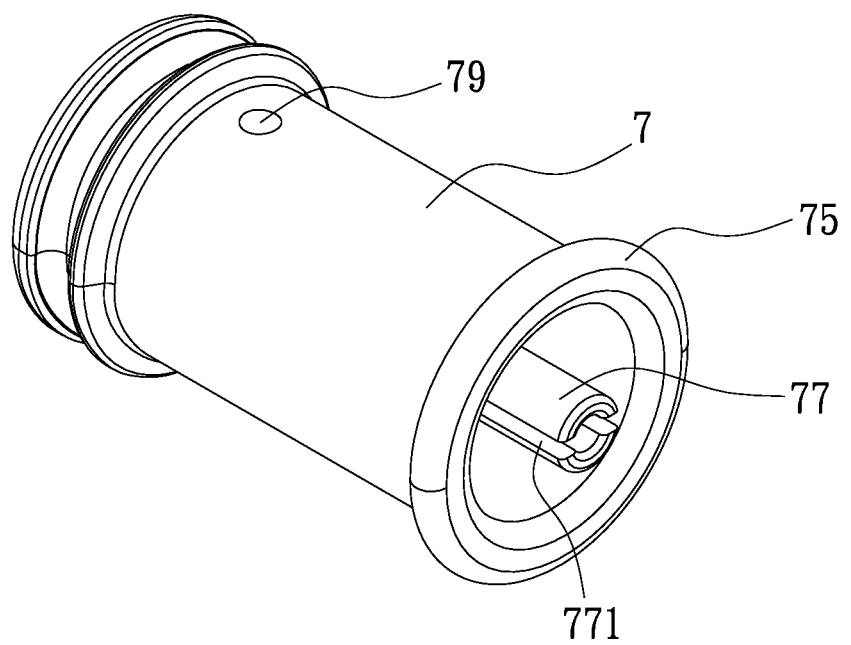
FIG. 8 shows a second embodiment of the slider used in the pressure indicator.
Figure 9:
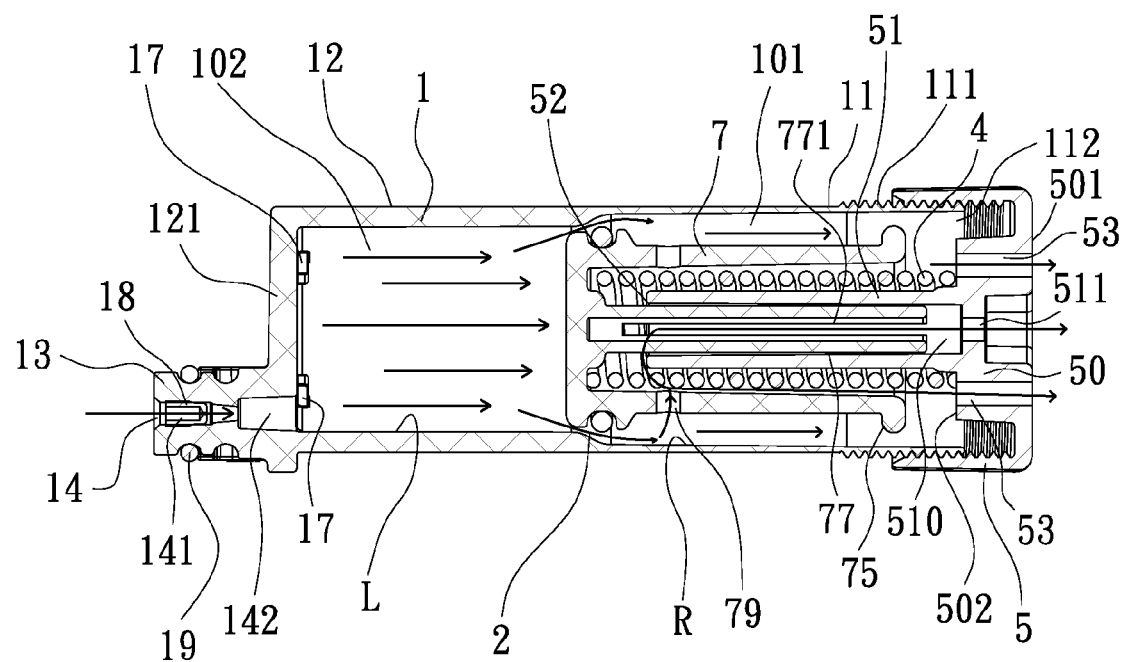
FIG. 9 shows a sectional view of the pressure indicator, wherein the second embodiment of the slider is moved by compressed air which exceeds a predetermined pressure.

FIGS. 8 and 9 show a second embodiment of the slider used in the pressure indicator, wherein the slider 7 has an open end with an annular outwardly protruding edge 75 and a closed end opposite to the open end thereof and defines therein an inner space. Also, the slider 7 has a central tube 77 which extends from an inner surface of its closed end, through the inner space thereof, to go beyond the open end thereof. The central tube 77 of the slider 7 defines a plurality of spaced slits 771 along its outer surface. In particular, the slider 7 defines a vent hole 79 at its surrounding wall. When the pressure of the compressed air exceeds a predetermined pressure, the slider 7 can be moved from the second bore 102 of the second segment 12 to the first bore 101 of the first segment 11. The colored O-ring of the slider 7 can reach the tapered annular surface 2 of the transparent tube 1, wherein an annular gap is existed between the colored O-ring and the tapered annular surface 2 (see FIG. 9), so that some of the excessive compressed air may flow through the annular gap to enter the first bore 101 of the first segment 11 and then pass through the peripheral through holes 53 to flow out of the pressure indicator. In addition, some of the excessive compressed air may enter the inner space of the slider 7 via the vent hole 79, and then flow into the central hole 510 of the cap 5 via the slits 771 of the central tube 77 of the slider 7, and finally pass through the central through hole 511 of the cap 5 to be released into the ambient environment, so that the object can be protected from damages due to overpressure.

Figure 10:
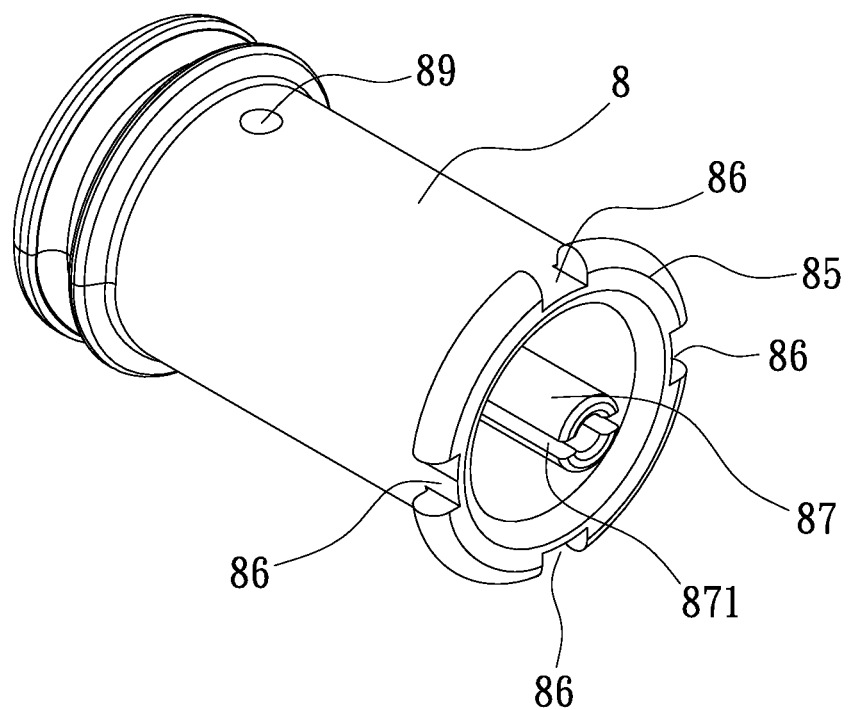
FIG. 10 shows a third embodiment of the slider used in the pressure indicator.
Figure 11:
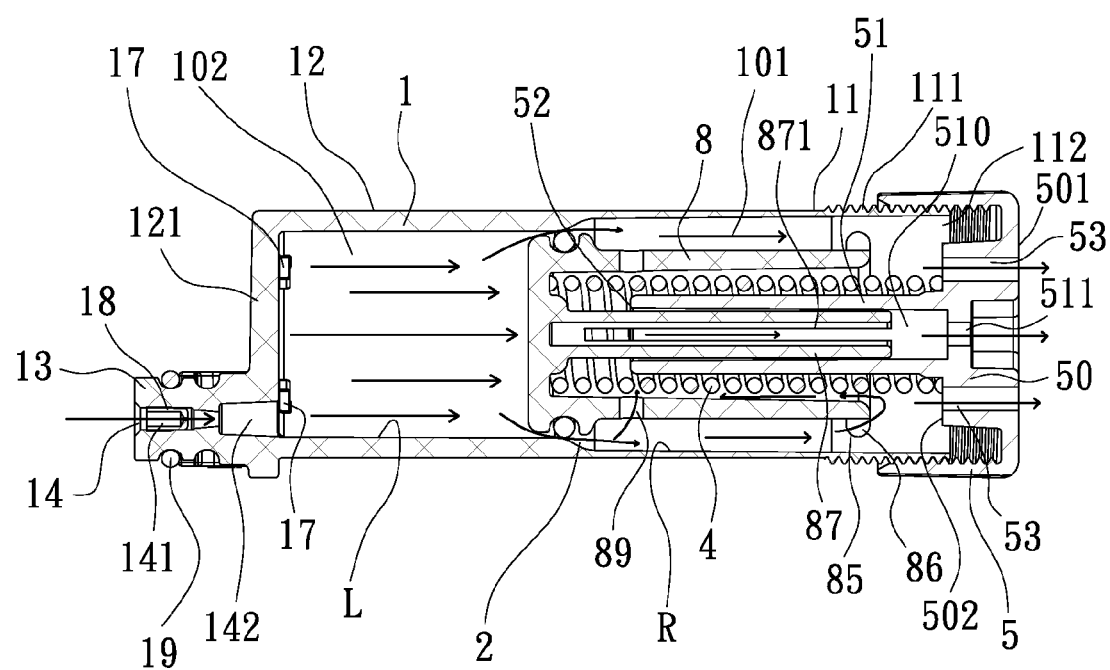
FIG. 11 shows a sectional view of the pressure indicator, wherein the third embodiment of the slider is moved by compressed air which exceeds a predetermined pressure.

FIGS. 10 and 11 show a third embodiment of the slider used in the pressure indicator. The slider 8 has an open end with an annular outwardly protruding edge 85 and a closed end opposite to the open end thereof and defines therein an inner space, wherein the annular outwardly protruding edge 85 defines a plurality of spaced cuts 86. Also, the slider 8 has a central tube 87 which extends from an inner surface of its closed end, through the inner space thereof, to go beyond the open end thereof. The central tube 87 of the slider 8 defines a plurality of spaced slits 871 along its outer surface. In particular, the slider 8 defines a vent hole 89 at its surrounding wall. When the pressure of the compressed air exceeds a predetermined pressure, the slider 8 can be moved from the second bore 102 of the second segment 12 to the first bore 101 of the first segment 11. The colored O-ring of the slider 8 can reach the tapered annular surface 2 of the transparent tube 1, wherein an annular gap is existed between the colored O-ring and the tapered annular surface 2 (see FIG. 11), so that some of the excessive compressed air may flow through the annular gap to enter the first bore 101 of the first segment 11 and then pass through the peripheral through holes 53 to flow out of the pressure indicator. In addition, some of the excessive compressed air may enter the inner space of the slider 8 via the spaced cuts 86 and the vent hole 89, and then flow into the central hole 510 of the cap 5 via the slits 871 of the central tube 87 of the slider 8, and finally pass through the central through hole 511 of the cap 5 to be released into the ambient environment, so that the object can be protected from damages due to overpressure.

In light of the foregoing, the pressure indicator of the present invention can be applied to an air compressor. Particularly, the pressure indicator, which has the appearance of a pen and can conduct an operation similar to a piston moving in a cylinder, can be detachably connected to one outlet of the air storage container of the air compressor. The pressure indicator includes a transparent tube provided therein with the tapered annular surface 2, between the first bore 101 and the second bore 102 thereof. In operating the air compressor, when the compressed air produced in the air compressor exceeds a predetermined pressure, the compressed air can pass through the tapered annular surface 2 to be released into the ambient environment. Thus, the air compressor has no need to be installed with a mechanical safety valve to prevent an object from being overly inflated. Additionally, the pressure indicator, which has a structure different from conventional devices, can measure the pressure of the compressed air precisely and sensitively. These features render the present invention novel and inventive.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A pressure indicator for an air compressor, comprising:
    a transparent tube including a first segment and a second segment, the first segment defining therein a first bore, the second segment defining therein a second bore, the first bore of the first segment having a diameter greater than the second bore of the second segment, the first segment being integrally formed with the second segment such that a tapered annular surface is formed between an inner surface of the first segment, which defines the first bore, and an inner surface of the second segment, which defines the second bore, wherein the first segment has an open end opposite to the second segment, the second segment has an end wall provided with a connector defining therethrough an air channel and being used for connection to one outlet of the air compressor, and the second segment is provided with a pressure-indicating scale at its outer surface;

a slider mounted in the transparent tube for being pushed by compressed air from the outlet of the air compressor to move towards the open end of the first segment of the tube, the slider being shaped as a hollow cylindrical body which has an open end with an annular outwardly protruding edge and a closed end opposite to the open end thereof and defines therein an inner space, the slider has a central tube which extends from an inner surface of its closed end, through the inner space thereof, to go beyond the open end thereof, wherein a step is formed between the inner surface of the closed end of the slider and the central tube of the slider, the central tube of the slider defining a plurality of spaced slits along its outer surface, the slider defining at its surrounding wall, near its closed end, an annular groove to be fitted with a colored O-ring;

a compression spring received in the inner space of the slider and fitted around the central tube of the slider, wherein one end of the compression spring is urged against the inner surface of the closed end of the slider, and the compression spring slightly contacts an inner surface of the slider that defines the inner space of the slider; and a cap mounted to the open end of the first segment of the tube, the cap having an inner base and a central tube extending from the inner base, the central tube of the cap having a diameter less than the inner base of the cap, thus forming an annular inner surface therebetween, the central tube of the cap having an open end opposite to the inner base and defining therein a central hole which opens out at the open end thereof, wherein the central hole of the central tube of the cap has a diameter greater than the central tube of the slider, but the diameter of the central tube of the cap being less than the internal diameter of the compression spring, the other end of the compression spring being urged against the annular inner surface of the inner base of the cap.

2. The pressure indicator of claim 1, wherein the air channel is composed of a small-diameter channel and a large-diameter channel, the small-diameter channel being fitted with a buffering plug to moderate instantaneous pressure surge of the compressed air supplied from the air compressor, the large-diameter channel being adjacent to the second segment of the tube; the inner base of the cap defines therethrough a central through hole communicating with the central hole of the cap and defines a plurality of peripheral through holes around the central through hole.

3. The pressure indicator of claim 2, wherein the end wall of the second segment is further provided with a pair of connection hooks at two opposite sides of the connector, the outlet of the air compressor being provided with a flange, the connection hooks being engaged with the flange of the outlet of the air compressor while the connector being inserted into the outlet by turning the transparent tube, whereby the pressure indicator can be quickly connected to the air compressor.

4. The pressure indicator of claim 1, wherein the annular outwardly protruding edge defines a plurality of spaced cuts.

5. The pressure indicator of claim 1, wherein the slider defines at least one vent hole at its surrounding wall.

* * * * *